May 4, 1937.    E. J. HOUDRY    2,078,949
CONTROL OF CHEMICAL REACTIONS
Filed March 23, 1935    3 Sheets-Sheet 1
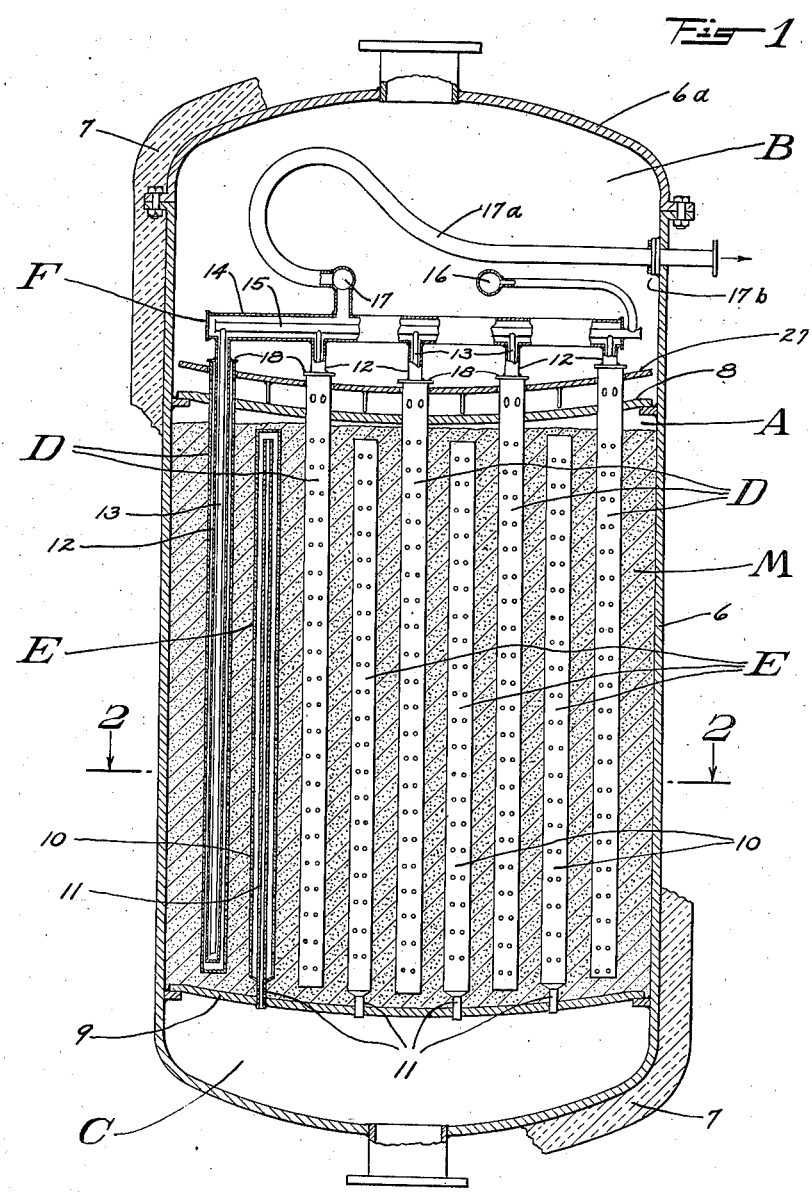
INVENTOR.
Eugene J. Houdry
BY
Ira L. Nickerson
ATTORNEY.

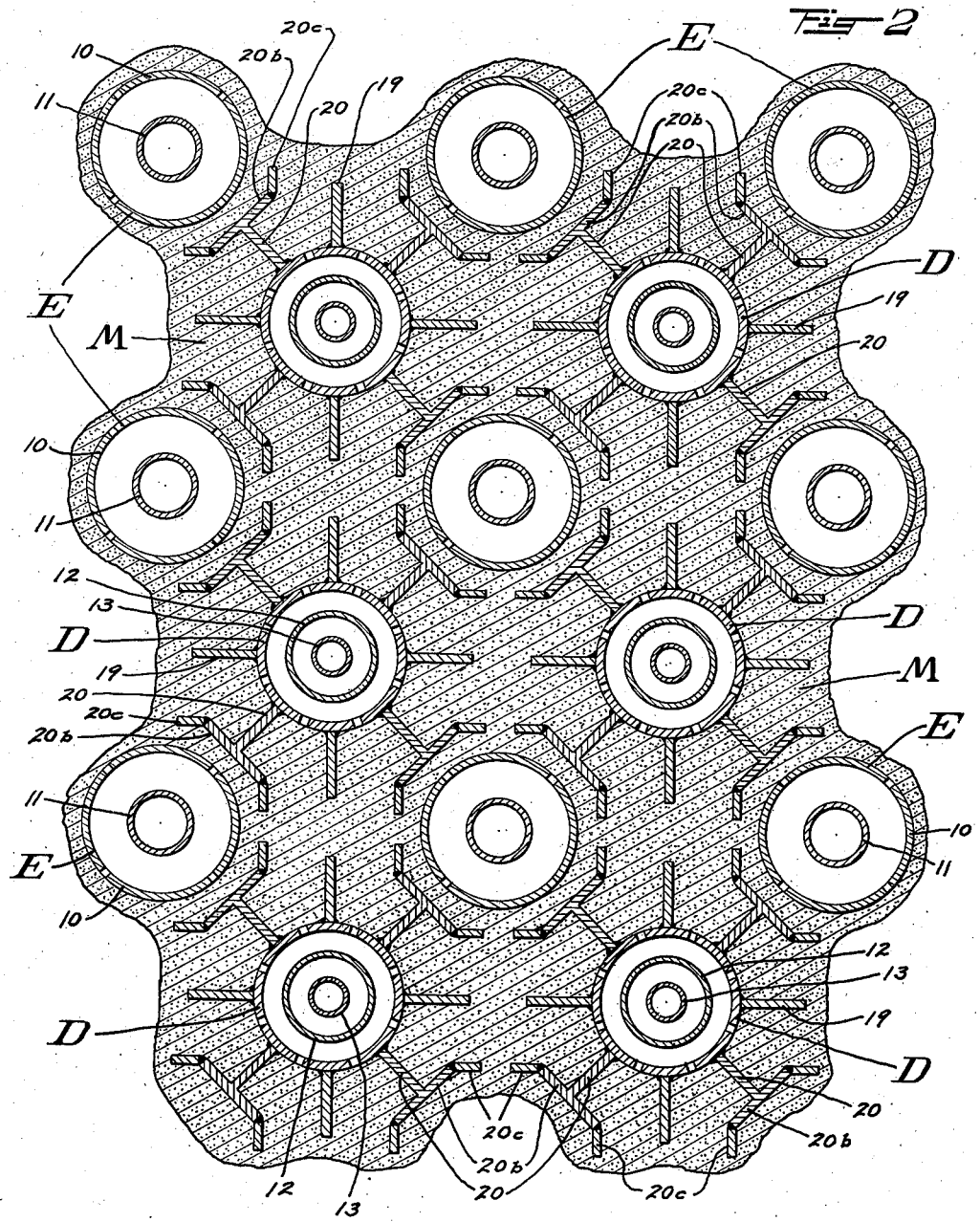

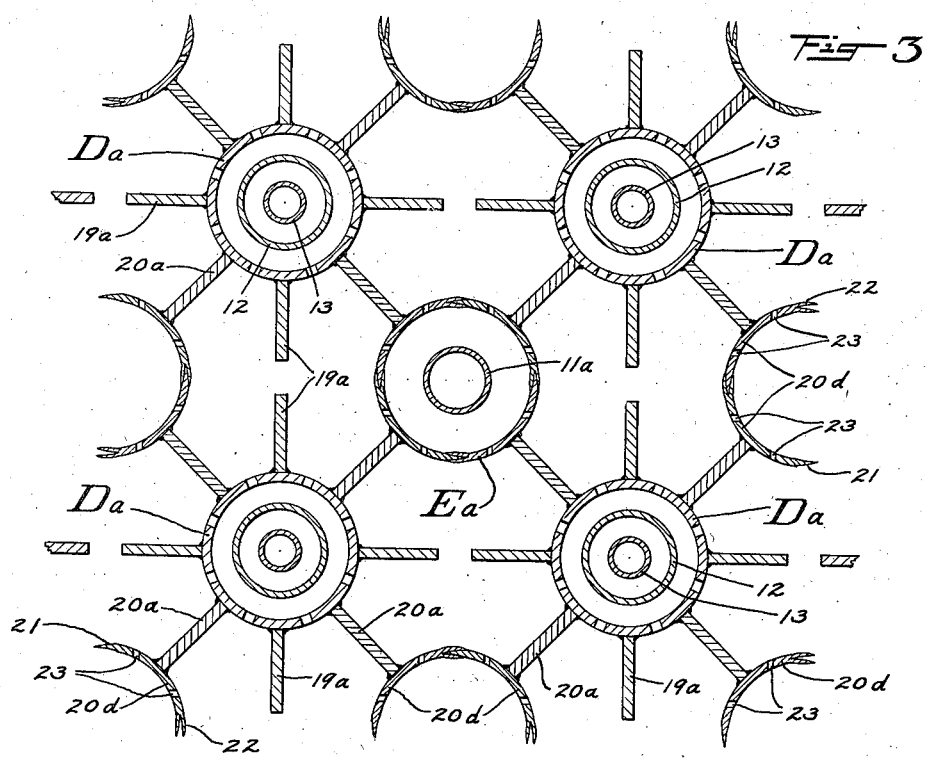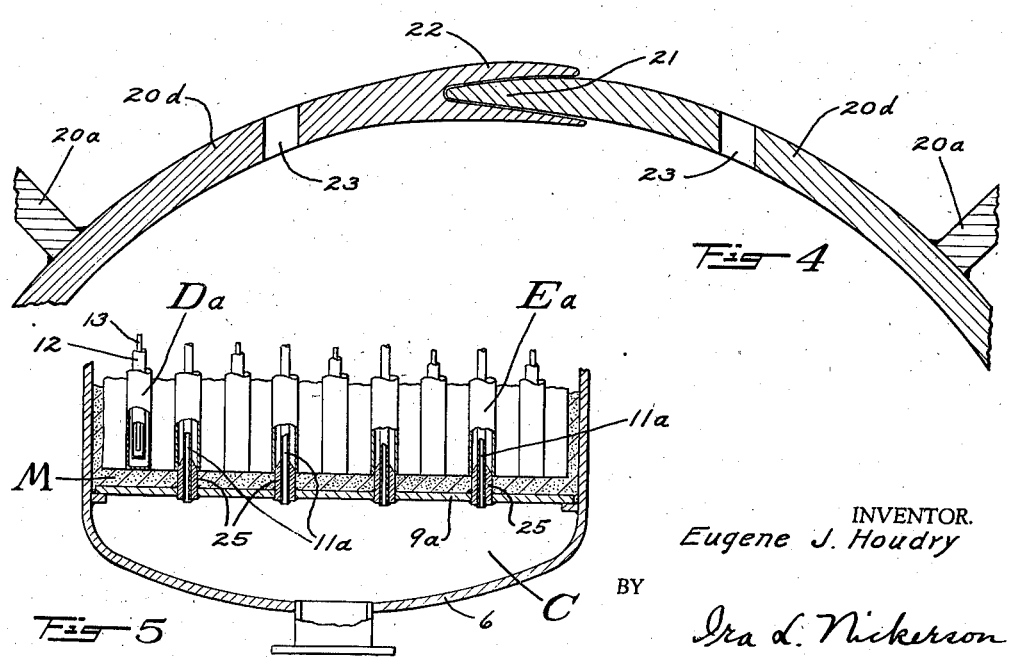

Patented May 4, 1937

2,078,949

UNITED STATES PATENT OFFICE 2,078,949

CONTROL OF CHEMICAL REACTIONS

Eugene J. Houdry, Philadelphia, Pa., assignor to Houdry Process Corporation, Dover, Del., a corporation of Delaware Application March 23, 1935, Serial No. 12,564

19 Claims. (Cl. 23—288)

This invention relates to chemical reactions, both endothermic and exothermic, which involve the use of contact masses. The latter may be absorbent, adsorbent, mere spreading material, or enter chemically into the reaction. More particularly, the invention has to do with reactions which are strongly exothermic, such, for example, as the catalytic synthesis of ammonia, production of sulphur trioxide in the manufacture of sulphuric acid, the regeneration or reactivation by oxidation of contact masses contaminated by coky and tarry deposits after use in the treatment or conversion of mineral oils, etc. The invention involves both process and apparatus aspects.

One object of the invention is to control the temperature of the reaction in a uniform manner all through the contact mass so as to maintain the same within a predetermined temperature range. Another object is to remove the heat at a rapid rate and in large amount. Another object is to spread or disperse the reactant fluids all through the contact mass. Still another object is to provide suitable apparatus for realizing the above results.

The invention involves supplying the reactant fluids to the converter at a temperature or temperatures within or near the reaction range, so that the reaction will begin and be continued at practically the same rate without possibility of interruption, and passing a fluid in a plurality of streams through the mass and in intimate but indirect heat exchange with the latter. The indirect heat exchange particularly contemplated is that effected through an intervening wall and across a gaseous space. The fluid may supply heat to the reaction if endothermic, and, when exothermic, it is utilized to remove the generated heat or any undesired or excess part of the same. By preference, distribution of reactants and removal of products is effected substantially uniformly all through the mass by two series of apertured elements embedded in the mass in symmetrical arrangement after the manner disclosed in my copending application Serial No. 611,362, filed May 14, 1932, Patent 2,042,468, issued June 2, 1936, and the independent heat exchange fluid may be circulated through the interior of the series of elements which remove the reaction products without interfering with such function, as disclosed in the copending application of myself and R. C. Lassiat, Serial No. 728,544, filed June 1, 1934. Suitable heat conducting means are provided within the contact mass to effect rapid movement of heat between the mass and the circulated heat exchange medium. Such means are preferably in the form of fins radiating from the elements of the outlet series. These fins control to a large extent the dispersion and movement of the reactant fluids and the reaction products as well as the movement of heat. In one modification of the invention, they even combine or cooperate to form elements of the other conduit series.

In order to illustrate the invention and the manner of its use, reference will now be had to the accompanying drawings, in which:

Fig. 1 is a vertical sectional view of a converter, the fins on one of the series of conduits being omitted for the sake of clearness;

Fig. 2 is a transverse sectional view on an enlarged scale of the interior of the converter substantially on the line 2—2 of Fig. 1;

Fig. 3 is a transverse sectional view similar to Fig. 2, omitting the contact mass and showing a modification in which the fins cooperate to form one of the series of conduits;

Fig. 4 is a greatly enlarged sectional view showing a sliding joint between the interengaging fins on two of the conduits shown in Fig. 3; and Fig. 5 is a fragmentary vertical sectional view of the lower end of a converter such as shown in Fig. 1, illustrating the assembly of the modification shown in Figs. 3 and 4.

The converter shown in Fig. 1 is made up of an outer casing or shell 6 having a detachable cover 6a, the entire exterior being suitably protected against heat losses as by a thick layer of heat insulating material 7. The interior of the converter is divided by upper and lower partitions or flue sheets 8 and 9 into a large central reaction chamber A and upper and lower end or manifolding chambers B and C. Mounted upon the flue sheets so as to extend across reaction chamber A from opposite sides in parallelism and in symmetrical arrangement are two series of elements D and E adapted for uniform distribution of reactant fluids and removal of reaction products within and throughout a contact mass M substantially filling the reaction chamber A. In the form shown, perforated conduits D of one series are mounted in and extend somewhat above upper flue sheet 8 to effect communication between reaction chamber A and upper manifolding chamber B, while elements E of the other series are mounted in lower flue sheet 9 to effect communication between reaction chamber A and lower manifolding chamber C. Elements D are of the single conduit type, but are arranged to enclose heat exchange members as will be later described. Suitable means will be used to keep mass M from beneath elements D in order that they may be free to expand or lengthen under temperature changes but, for clearness, such means are not shown since they form no part of the present invention. Elements E are of the nested conduit type such as disclosed in United States Patent No. 1,987,904, issued to me on January 15, 1935, and comprise an outer perforated member 10 having upper and lower closed ends contained wholly within reaction chamber A and an inner conduit 11 which extends through flue sheet 9 and to a point adjacent the farther closed end of conduit 10. Inner member 11 serves as the sole means of communication between the interior of member 10 and manifolding chamber C.

Into the upper open end of each of conduits D extends a heat exchange member in the form of an imperforate conduit 12 which encloses an inner supply conduit 13, the heat exchange member extending substantially the full length of member D in spaced telescoped relation. Each heat exchange member extends beyond its corresponding element D and conduits 12 connect with the outer member 14 of a nested manifold F, the inner or supply conduit 15 of which is connected to the inner supply conduits 13 of each of the heat exchange members. There may be a series of such nested manifolds F having a transverse supply main 16 connected to inner supply members 15 and an outlet main 17 connected with the outer members 14. The connections leading from mains 16 and 17, such as 17a, to the exterior of the converter are preferably arranged with a detachable joint such as 17b for convenient assembly and disassembly of the converter. The outer conduits 12 of the heat exchange members may have stops 18 thereon to serve as covers or closures for the upper open ends of elements D and to limit the projection of the heat exchange members within such elements. The details of the heat exchange system and the manifolding arrangement therefor is more fully disclosed in the copending application of myself and Thomas B. Prickett, Serial No. 8,262, filed February 26, 1935.

To insure the desired degree of heat transfer between elements D enclosing the heat exchange members 12, 13 and contact mass M, heat conducting members or fins radiate from members D out into the mass, as clearly indicated in Fig. 2, to provide a multiplicity of heat conducting channels all through the mass, such fins being omitted from Fig. 1 for the sake of clearness. In the form shown, elements D are provided with four straight axially disposed fins 19 in symmetrical arrangement 90° apart. Alternating with fins 19 are other straight fins 20 having transverse outer ends 20b with diverging or flaring extensions or wings 20c so arranged as to substantially enclose, in a rather closely spaced manner, the plain or non-finned outer conduits 10 of elements D. As shown in Fig. 2, the fins form a uniform pattern of heat conducting elements radiating into mass M so as to conduct heat either toward or from elements D depending upon whether the fluid circulated in the heat exchange members 12, 13 is at a higher or lower temperature than that of the contact mass M. The form and arrangement of fins 20 is such as to make the exchange of heat very effective in those portions of the mass which immediately surround conduits 10 of elements E. By preference, the ports in conduits 10 are substantially opposite the center of outer portions 20b, 20c of fins 20, while the ports in elements D are intermediate the fins of the series 19 and 20 so that the movement of fluid between elements D and E is baffled and directed so as to be spread as uniformly as possible throughout contact mass M.

Figs. 3, 4 and 5 show a modification providing a simplified construction in which the fins radiating from elements Da are utilized to form the outer conduits of elements Ea corresponding to conduits 10 of Figs. 1 and 2. As indicated in Fig. 3, the straight fins 19a and 20a are substantially the same as in Fig. 2, with the exception that they are slightly longer and the transverse outwardly flared portion 20d on fins 20a is circular, although this shape may be varied. Parts 20d cooperate to form the outer conduits of series Ea. For this purpose, the ends of outwardly flared portions 20d may merely abut, or interfit, or interlock, as may be desired. One arrangement which is satisfactory is disclosed in enlarged detail in Fig. 4, where the reduced end 21 of one member 20d is shown as received within an elongate slot or recess formed by the forked end 22 of an adjacent part 20d on the next element Da. Any suitable porting arrangement may be provided. If parts 20d are in abutting relation, the ports may be provided by notches in one of both of the abutting edges. When interfitting or interlocking joints are provided, as shown in Figs. 3 and 4, ports may be provided in the web parts 20d preferably adjacent the joint and slanting in the direction of the same, as indicated at 23 in Fig. 4.

Inasmuch as the elements D of Fig. 1 and Da of Fig. 5 must not contact lower tube sheet 9 or 9a in order that there may be space for expansion, it is necessary that a somewhat different structural arrangement from that shown in Fig. 1 be provided for the members Da with interlocking fins disclosed in the modification in Figs. 3, 4 and 5. Such an arrangement is illustrated in Fig. 5, wherein inner conduits 11a are provided with or extend through conical members or bosses 25 mounted in or on lower tube sheets 9a, such bosses to telescope with a sliding fit within the lower ends of the interengaging fin parts 20d which make up the outer conduits of elements Ea. This construction lends itself readily to assembly and disassembly of the converter. Inner conduits 11a, with bosses 25, are mounted on lower tube sheet 9 or 9a, while the elements Da, with interengaging fin members forming the outer conduits Ea, will be mounted upon the upper tube sheet. The upper tube sheet, with the conduits Da assembled thereon, will then be lowered through the open top of the converter with the interengaging fin members Da telescoping over the inner conduits 11a and finally engaging conical bosses 25 when the upper tube sheet is in place. The heat exchange system will then be lowered through the open end of the converter with the members 12, 13 extending within the upper open ends of conduit series D or Da, and, after the connections have been made, cover 6a will thereafter be secured in place to complete the assembly of the converter.

When the reaction taking place within chamber A is strongly exothermic, the reactants will be admitted to manifolding chamber C at a temperature within the range of the reaction or slightly therebelow. The reactants pass up through inner tubes 11 or 11a without substantial heat exchange with contact mass M before passing into outer conduits 10 of Figs. 1 and 2 or Ea of Figs. 3 and 5, to be uniformly distributed throughout the mass. The reaction products pass from the mass into the ports of the nearest elements D or Da and over the outer imperforate conduits 12 of the heat exchange elements therein, giving up some of the heat of the reaction to the latter. In the meantime, the fin series 19, 20 and 19a, 20a conduct heat from all portions of the mass back to elements D or Da, whence it is transmitted largely by radiation and, to a less extent, by convection, to the heat exchange medium in members 12, 13. The circulated heat exchange medium may be a gas, but is preferably a liquid such as water, mercury, diphenyl, or the like, circulated under pressure. The disclosed arrangement of fins, in combination with the fluid heat exchange system, permits the removal of all heat in excess of that necessary to maintain the reaction. By adjusting the speed of the circulation and the entering temperature of the fluid, the temperature of the entire contact mass may be regulated to a nicety, and transitions in temperature of the entire mass can be effected quickly and uniformly.

When the reaction is endothermic, the movement of reactants through the mass may be in the same direction as above described or in the opposite direction. If in the opposite direction, the reactants will be admitted to manifolding chamber B, be distributed by elements D or Da all through the mass, and leave through elements E or Ea. The heat exchange medium can then be utilized in the same or in reverse flow to impart any desired degree of heat to the reactants. If the reactants pass, before entering the mass, over manifolds F and the connections thereto in manifolding chamber B and over outer imperforate conduits 12 of the heat exchange members which are disposed within elements D and Da, they will carry some of the heat from the heat exchange medium by convection into the mass. In either case, however, heat will be distributed or spread through the mass by radiation from conduits 12 to elements D and Da and thence conducted by fins 19, 20 and 19a, 20a uniformly all through the mass. Thus the requisite heat to hold the contact mass at the reaction temperature is supplied directly to the mass by the fins and the heat exchange system, and superheating of the reactants prior to admission to the converter with the attendant disadvantages can be greatly minimized, or entirely avoided when the reactants are charged into manifolding chamber C.

To reduce heat exchange by radiation between upper flue sheet 8 and manifolds F of the heat exchange system, suitable baffling means may be provided such as a removable baffle sheet 27 (Fig. 1). This and other baffling arrangements are disclosed and claimed in the copending application of Mr. T. B. Prickett Serial No. 14,068, filed April 1, 1935.

The present invention differs in a number of respects from a companion invention disclosed and claimed in my copending application Serial No. 6,291, filed February 13, 1935. An important difference lies in supplying in the present case the reactants for an exothermic reaction at substantially the temperature of the reaction and in extracting the excess heat of the reaction by the independent heat exchange medium alone.

The converter may be mounted, assembled and operated in any desired position, as vertically, horizontally or obliquely. To reduce damage to a contact mass from the movement of the conduits due to temperature changes, especially when the mass is in bits or molded pieces, the converter shown in Fig. 1 may be inverted. The invention is to be considered as covering the above and all other changes, modifications and adaptations within the scope of the appended claims.

I claim as my invention:

1. In the control of exothermic reactions taking place in the presence of a contact material, the process which comprises disposing the contact material in a large and deep mass, supplying the reactants at substantially the temperature of the reaction, distributing the reactants all through the mass, removing the reaction products simultaneously from points distributed throughout the mass, removing a sufficient amount of the heat developed from the exothermic reaction to maintain the reaction within a predetermined temperature range by a cooling medium sent within and through the mass in a plurality of streams in indirect heat exchange therewith, and surrounding said streams by moving columns of reaction products interposed between the mass and said streams.

2. In the control of exothermic reactions effected by the aid of contact masses, the process which comprises providing a multiplicity of heat conducting channels in and extending all through the mass, feeding reactant fluids to the mass at substantially the temperature of the reaction, passing a heat exchange fluid in a plurality of streams within and through the mass in indirect heat exchange with the latter, surrounding said streams by moving columns of reaction products leaving the mass, and utilizing said channels to conduct heat from said mass to the heat exchange fluid.

3. In the control of exothermic reactions for the production of gaseous products effected by the aid of contact material, the process which comprises disposing the contact material in a large and deep mass, providing a multiplicity of heat conducting channels in and extending all through the mass, feeding reactant fluids to the mass at substantially the temperature of the reaction, passing a cooling fluid in a plurality of streams within and through the mass in indirect heat exchange with the latter and directing a major part of the excess heat of the reaction by radiation from said channels and a minor part of such heat by convection to said cooling fluid, the convective transfer being effected by passing the gaseous reaction products leaving said mass over said streams and between the latter and the mass.

4. In controlling an exothermic reaction effected by the aid of a catalyst so as to maintain the reaction temperature of the latter within a predetermined range, the operative process which comprises disposing the catalyst in a large and deep mass, feeding the reactants to the reaction zone at about the reaction temperature, distributing the reactants substantially uniformly all through the mass, removing the products from within the mass in a manner to effect substantially uniform reaction conditions all through the mass, and removing heat from the mass coincidentally and coextensively with the removal of products by a separate and distinct cooling medium by sending the medium within and through the mass in indirect heat exchange therewith and surrounding the medium by reaction products leaving the mass.

5. A converter for effecting exothermic reactions comprising a casing providing a reaction chamber for containing a contact mass, means for admitting to said chamber reactants at temperatures approximating those of the reaction, means for removing the products of the reaction from said chamber, means for directing through said chamber a cooling fluid out of direct contact with the contents of said chamber and surrounded by reaction products leaving said chamber, and means embedded in said mass for effecting the transfer of heat from all portions of said mass including those adjacent said admitting means to said cooling fluid.

6. A converter for effecting exothermic reactions comprising a casing providing a reaction chamber, a contact mass therein, a series of apertured distributing conduits and a series of apertured outlet conduits embedded in said mass, means within the individual members of said distributing series for admitting thereto reactants, conducting means within the members of said outlet series for an independent cooling medium, heat conducting means radiating from the members of said outlet series only, said last named means being proportioned and arranged to conduct substantially all of the undesirable heat of the reaction to said outlet series for absorption by said cooling medium.

7. A converter for effecting exothermic and endothermic reactions comprising a casing providing a reaction chamber, a contact mass therein, means for sending reactants into said chamber, an apertured outlet conduit embedded in said mass, conducting means within said conduit for an independent heat exchange medium, heat conducting means extending from said conduit into said mass, said last named means being proportioned and arranged to conduct substantially all of the undesirable heat of an exothermic reaction to said conduit for absorption by said heat exchange medium.

8. A converter for effecting exothermic and endothermic reactions comprising a casing providing a reaction chamber, a contact mass therein, a series of apertured distributing conduits and a series of apertured outlet conduits embedded in said mass, conducting means within the members of said outlet series for an independent heat exchange medium, and fins radiating from the members of said outlet series into said mass, said fins presenting a large surface area and at least partly surrounding the conduits of said distributing series.

9. A converter for effecting exothermic and endothermic reactions comprising a casing providing a reaction chamber, a contact mass therein, a series of apertured distributing conduits and a series of apertured outlet conduits embedded in said mass, conducting means within the members of said outlet series for an independent heat exchange medium, and fins radiating from the members of said outlet series into said mass, certain of said fins interconnecting individual conduits of said distributing and outlet series.

10. A converter for effecting exothermic reactions comprising a casing providing a reaction chamber, a contact mass therein, a series of apertured distributing conduits and a series of apertured outlet conduits embedded in said mass, conducting means within the members of said outlet series for an independent cooling medium, and straight fins and fins with outwardly flaring parts radiating from said outlet series, said last named fins being arranged to enclose the members of said distributing series to conduct away the undesirable heat of the reaction and to baffle and disperse through said mass the fluids issuing from said distributing series.

11. In apparatus for effecting chemical reactions, a converter providing a reaction chamber for containing a contact mass, apertured conduits extending into said chamber to be embedded in the mass for admission and egress of fluid, and means including members attached to the exterior of said conduits interconnecting the same throughout said reaction chamber.

12. In apparatus for effecting chemical reactions, a converter providing a reaction chamber for containing a contact mass, apertured conduits extending into said chamber to be embedded in the mass for admission or egress of fluid, and means including elongate arcuate members with interengaging sides attached to said conduits to form other and independent conduits for egress or admission of fluid.

13. In apparatus for effecting chemical reactions, a converter providing a reaction chamber, a contact mass therein, two series of apertured conduits extending into said mass in symmetrical arrangement to effect distribution of reactants within the said mass and removal of reaction products from within said mass, and heat conducting members on the conduits of one of said series radiating into said mass, certain of said members cooperating to form the conduits of said other series.

14. In apparatus for effecting chemical reactions, a converter providing a reaction chamber for containing a contact mass, a series of perforated conduits extending into said chamber in symmetrical arrangement, and fins on said series having cooperating outer ends forming a second series of conduits alternating with the conduits of said first series.

15. In apparatus for effecting chemical reactions, a converter providing a reaction chamber for containing a contact mass, a series of perforated conduits extending into said chamber in symmetrical arrangement, straight fins radiating from said conduits, fins having flaring outer ends alternating with the said straight fins, the flaring outer ends of said last named series cooperating to form a second series of conduits.

16. A fluid conduit adapted to be embedded in a contact mass for controlling chemical reactions taking place therein, said conduit having axially disposed fins mounted on the exterior thereof for effecting heat exchange with the contact mass, certain of said fins having outwardly flaring and diverging ends for baffling fluids from adjacent conduits and to provide an increased surface area over that of adjacent fins.

17. A fluid conduit adapted to be embedded in a contact mass for controlling chemical reactions taking place therein, said conduit having on the exterior thereof straight fins alternating with other fins presenting a greater area comprising outwardly flaring and diverging ends for effecting heat exchange with the contact mass and for baffling fluids passing to or from adjacent conduits.

18. A fluid conduit adapted to be embedded in a contact mass for controlling chemical reactions taking place therein, said conduit having two series of alternately disposed axial members mounted on the exterior thereof for effecting heat exchange with the contact mass, the members of one series comprising straight fins while the members of the other series comprise a straight part with angularly disposed diverging portions shaped and arranged to form a portion of another fluid conduit.

19. A fluid conduit adapted to be embedded in a contact mass for controlling chemical reactions taking place therein, said conduit having two series of alternately disposed axial fins mounted on the exterior thereof for effecting heat exchange with the contact mass, the members of one series comprising straight fins while the members of the other series comprise a straight part intersected by an arcuate part with angularly disposed terminal ends extending toward the adjacent straight fins.

EUGENE J. HOUDRY.